United States Patent [19]

Panetti

[11] 4,100,795
[45] Jul. 18, 1978

[54] PROCESS AND A SYSTEM FOR MEASURING AND RECORDING UNDULATORY DEFORMATIONS OF A RAIL SURFACE

[75] Inventor: Romolo Panetti, Geneva, Switzerland

[73] Assignees: Speno International S.A., Geneva, Switzerland; Frank Speno Railroad Ballast Cleaning Co., Inc., Ithaca, N.Y.

[21] Appl. No.: 665,440

[22] Filed: Mar. 10, 1976

[30] Foreign Application Priority Data

Mar. 14, 1975 [CH] Switzerland .................. 3232/75

[51] Int. Cl.² ............................................. B61K 9/00
[52] U.S. Cl. .................................................. 73/146
[58] Field of Search ............... 33/1 Q, 1 S, 174 L, 33/174 P; 73/105, 146

[56] References Cited

U.S. PATENT DOCUMENTS

| | | | |
|---|---|---|---|
| 3,234,655 | 2/1966 | Skeels et al. | 33/174 L |
| 3,266,302 | 8/1966 | Spangler et al. | 73/105 |
| 3,353,404 | 11/1967 | Swift | 73/146 |
| 3,459,038 | 8/1969 | Swift | 73/146 |

FOREIGN PATENT DOCUMENTS 2,108,863  9/1971  Fed. Rep. of Germany ......... 73/146

*Primary Examiner*—Richard E. Aegerter
*Assistant Examiner*—Richard R. Stearns

[57] ABSTRACT

A process and a system for measuring and recording undulatory deformations of a rail surface. A feeling device is moved along the rail surface and an accelerometer is connected to the feeling device to generate a voltage signal representative of the acceleration encountered by the feeling device in contact with the deformations. The signal is amplified and filtered in function of the speed of the vehicle carrying the system, and thereafter twice integrated, then rectified and amplitude-modulated in function of the vehicle speed. A filter eliminates spurious signals from the modulated signal and a recording of the lastly filtered signal is effected. In addition, there is also provided a circuit for measuring and recording sound signals generated by the rolling vehicle.

17 Claims, 9 Drawing Figures

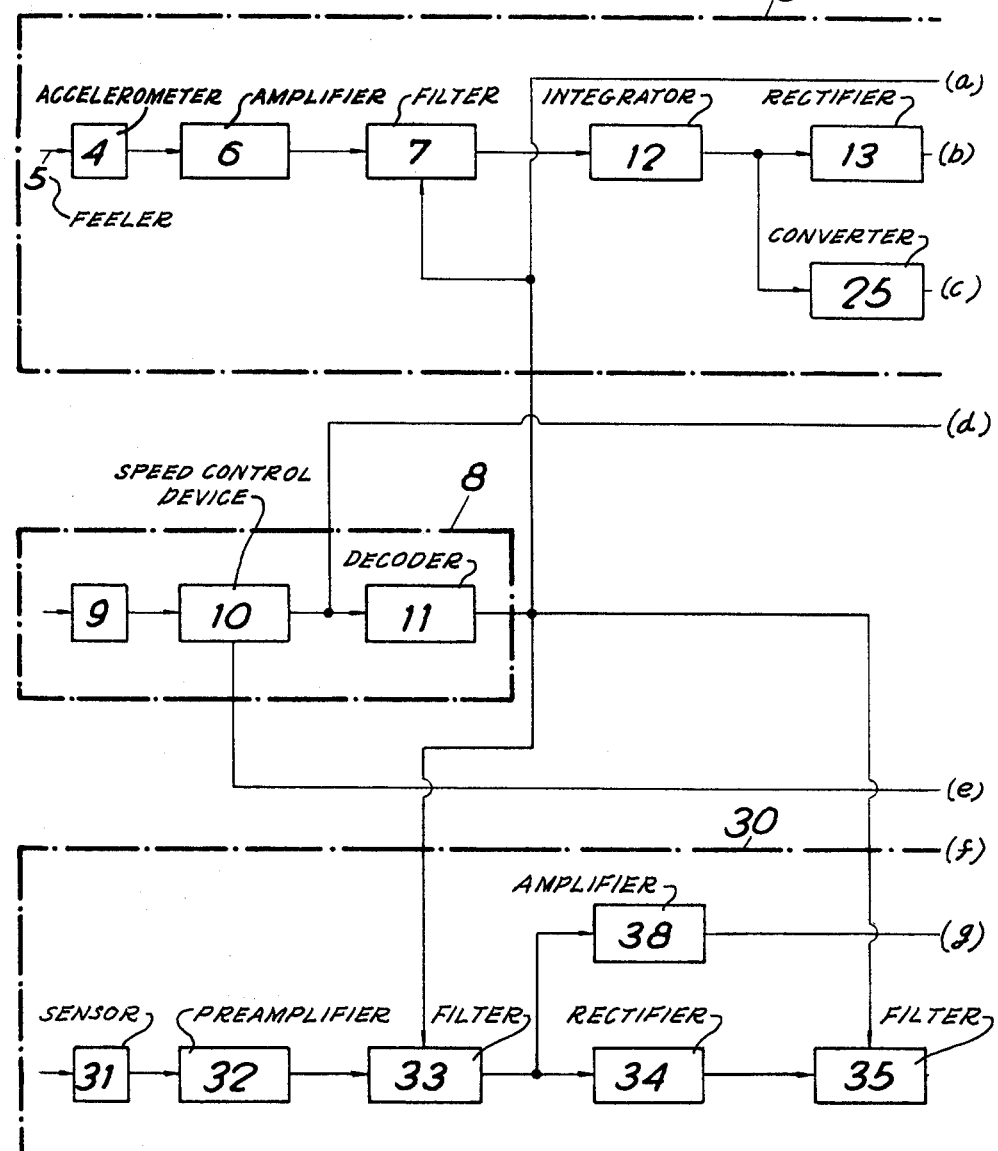

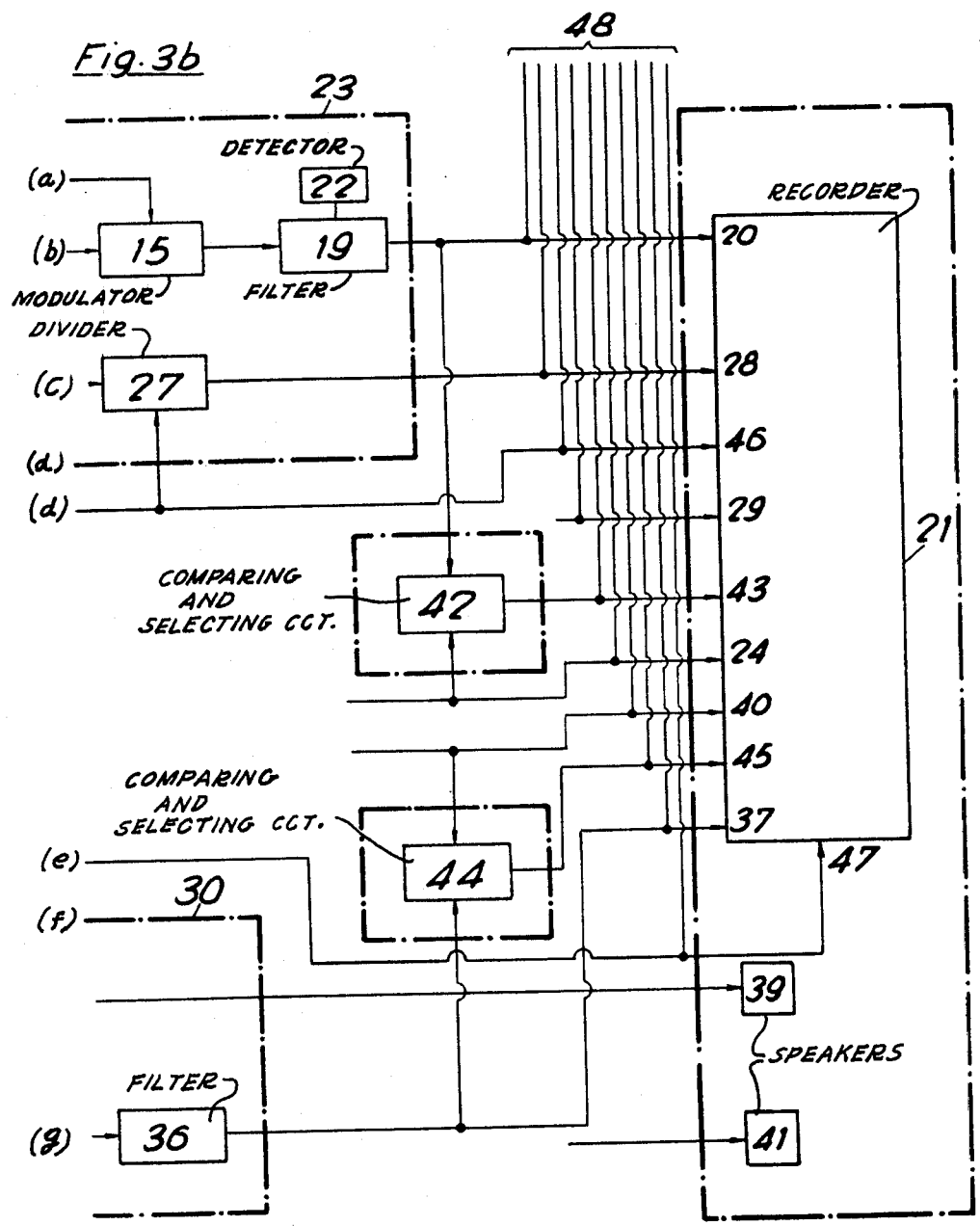

PROCESS AND A SYSTEM FOR MEASURING AND RECORDING UNDULATORY DEFORMATIONS OF A RAIL SURFACE

The present invention relates to a process of and to a system to carry out the process of measuring and recording undulatory or wavy deformations of the surface of rails.

There actually exists systems for detecting and recording data relative to the state of railroad tracks, such as for example apparatus to analyze the longitudinal profile, deviation, slope, spacing, skew or curvature of rails. Those known apparatus are however unsuitable to accurately detect undulation-like deformations along the surface of a rail since they mainly operate to check and record the general geometrical aspect of railroads. Moreover, the detecting and recording operations of those apparatus may be greatly affected when the rail-born vehicle onto which they are mounted passes over wavy sections of a rail, vibrations being then set not only into the measuring circuits but also on the recorder stylets used to record data about the rail conditions. It is therefore actually not possible to detect and measure the surface wear of a rail through the use of those known apparatus.

At the present time, the undulatory wear of a rail surface is usually detected in an empirical fashion through interpretation of defective records, as stated above, or through a visual inspection of the railway. But the data thereby obtained are wholly insufficient to establish either a meaningful estimation of the wear or to draw up a relevant maintenance work since neither the amplitude nor the wavelength of the undulatory deformation of the worn surface are known.

An object of the present invention therefore resides in a process of and system for measuring and recording undulatory deformations of a rail surface, which may be used conjointly with apparatus for detecting other information thereabout to form a realistic picture of the railway condition.

In accordance with the present invention, the process for measuring and recording undulatory deformations of a rail surface comprises the steps of moving a feeling device along the surface, generating a voltage signal by means of an accelerometer connected to the feeling device, said voltage being representative of the acceleration encountered by the feeling device moved along the rail surface, amplifying and filtering said signal as a function of the feeling device speed, twice integrating, rectifying the integrated signal, amplitude-modulating the rectified signal by a signal corresponding to the travelling speed of the feeling device to limit the peaks of the integrated signal, filtering the modulated signal to eliminate spurious signals, and recording the lastly filtered signal.

The present invention also resides in a system to carry out the above process, and which comprises a feeling device mounted on a rail-born vehicle to feel undulatory deformations of a rail surface, an accelerometer detecting the undulatory motions of the feeling device to generate a corresponding signal, an amplifying means to amplify said signal, a filtering means receiving the amplified signal and having a bandwidth which varies in function of the speed of said vehicle, means for twice integrating the filtered signal, a rectifying means fed with the integrated signal, means for amplitude-modulating the rectified signal with a signal corresponding to the speed of the vehicle, a filter connected to the amplitude-modulating means to eliminate spurious signals, and means for recording the resulting signal.

Preferred embodiments of the present invention will be hereinafter described with reference to the accompanying drawings, wherein FIGS. 1 and 2 respectively depict short and long undulatory deformations of a rail surface;

FIGS. 3a and 3b are a block diagram, when joined together, of the system in accordance with the present invention for measuring and recording undulatory rail surface deformations;

Figure 1:
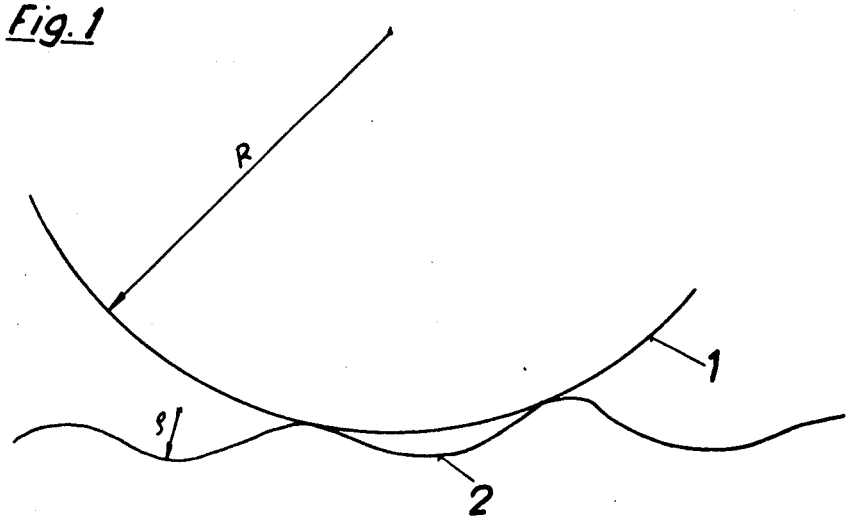
Figure 2:
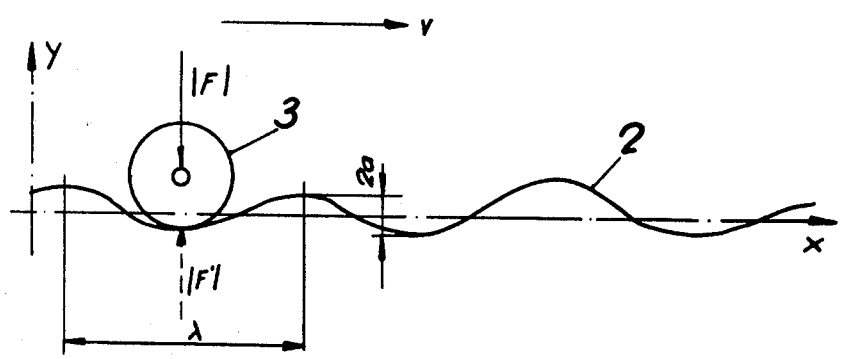

Referring to FIGS. 1 and 2, there are illustrated undulatory deformations occuring along a rail surface 2, and partly show why prior apparatus using accelerometers mounted on the wheel shaft of a rail-born vehicle cannot provide realistic results thereabout. Indeed, with short wavelength deformations, the wheel radius R is usually larger than the minimum curvature $\rho$ of the bottom of the undulating wave 2, and therefore the wheel 1 is actually jumping from one wave peak to the other, which does not allow gathering data about the wave characteristics. On the other hand, even if the curvature radius of the wave is larger than the wheel diameter (see FIG. 2), the forward speed $v$ of the vehicle as well as the weight of the wheel 3 do not permit fair estimation of the undulation since the wheel has a predominant tendency to take off the rail at undulation peaks and a quite large force $|F|$ would be required to avoid such take-off.

Assuming that the undulatory wear surface of a rail has a sinusoidal profile, the following relations are justified:

$$y = a \sin \omega \tau$$

$$y'' = a\omega^2 \sin \omega \tau$$

and with $$v = (x/t) ; \omega = 2\pi f; f = (v/\lambda)$$

We obtain $$y'' = -a\omega^2 \sin 2\pi(x/\lambda)$$

$y''$ has a maximum value for $\sin 2\pi(x/\lambda) = 1$
and therefore $y''\max = -a\omega^2 = -4\pi^2 a(v^2/\lambda^2)$
From the above, the maximum take-off force $|F'|$ may be computed:

$$|F'| = 4\pi^2 a \left(\frac{v}{\lambda}\right)^2 \cdot M$$

In the above relations, the various symbols designate:
$y$ = vertical coordinate of the sinusoidal curve 2 under consideration;

$y''$ = vertical acceleration;
$\alpha$ = maximum amplitude of curve 2;
$v$ = forward speed of the vehicle;
$\omega$ = angular velocity of sinusoidal curve 2;
$f$ = frequency of sinusoidal curve 2;
$\lambda$ = wavelength of sinusoidal curve 2;
$x$ = distance;
$M$ = weight of wheel 3; $t$ = time.

It may be of interest to give the following example based on realistic numerical data for the required force $|F'|$:

If, $v = 60$ km/h $= 16.67$ m/s $\lambda = 50$ mm $= 5.10^{-2}$m $\alpha = 0.15$ mm $= 0.15 \cdot 10^{-3}$m $M = 1000$ kg We obtain $$|F'| = 4\pi^2 \cdot 0.15 \cdot 10^{-3} \left(\frac{16.67}{5 \cdot 10^{-2}}\right)^2 \cdot 1000 = 658236.84 \, N$$

which gives in $K_p$, $|F'| = 67098.56 \, K_p$.

From the above figures, it is seen that to maintain the wheel in contact with the rail the wheel axle has to be loaded with a weight of 67 tons, while a maximum load per axle of about 20 tons is conventionally permitted.

Moreover, it is to be noted that, as a result of loads, the rail depression at the right hand side of wheel 3 is over 1 mm and therefore precise measure in the order of 100 mm may not be made. Additionally, the reaction forces from the axle suspension has to be taken into consideration, and, as a result, the data supplied by an accelerometer are merely a measure of the wheelrail reaction forces.

Turning now to FIGS. 3a and 3b, wherein the interconnecting leads are numbered in a like manner, a voltage waveform signal is fed from an accelerator 4 connected to a feeler 5 to an amplifier 6 connected to a band-pass filter 7, this signal being representative of the acceleration encountered by the feeler 5 along a plane perpendicular to the railway plane. The band-pass filter 7 is characterized in that its central frequency as well as its bandwidth vary simultaneously with speed variations of the vehicle by means of a speed-controlled signal supplied by the speed control device 8.

The feeler 5 is preferably disposed exteriorly of the zone disturbed by the rolling axles of the vehicle. Also, the feeler is so shaped that its surface in contact with the undulatory rail surface is of a curvature radius lower than that of the bottom of the smallest undulatory deformations to be measured. The feeler 5 is additionally elastically applied onto the rail surface.

The speed control device 8 is constituted of a speed decoder 9 which provides information about the instantaneous speed of the vehicle, a speed control means 10, and a binary decoder 11 for converting the signal from 10 into digital form. Such variation in the central frequency and the bandwidth of the filter is such that the response characteristics of the filter with respect to wavelengths falling within a range desired to be measured are substantially independent of the velocity. Indeed, the physical dimensions of the deformations imply a range of frequency which is in relationship with the frequency spectrum determining that undulatory wear signal, which is given by the following relation:

$f = (v/\lambda)$ where, the speed being variable, the variation range of $\lambda$ is defined.

Then, by twice integrating the output signal of filter 7, the value of the distance travelled by the feeler is obtained, since, as is known, acceleration equates the second derivative of the distance with respect to time, and hence a measure of the travelled distance may be obtained through a double integration of the acceleration measure. Integrating may be effected in various ways:

(a) Either by an operational, analog or passive integrator 12, or in a similar manner, by analog filters, the response of which is inversely proportional to the square of the frequency;

(b) or by means of entirely digital means or through analog-digital means.

The above double-integration operation makes the measure of the distance travelled by the feeler automatically independent upon the vehicle speed, and directly proportional to the amplitude of the wear wave, and this regardless of the length of the wave within the measure limits.

Figure 4:
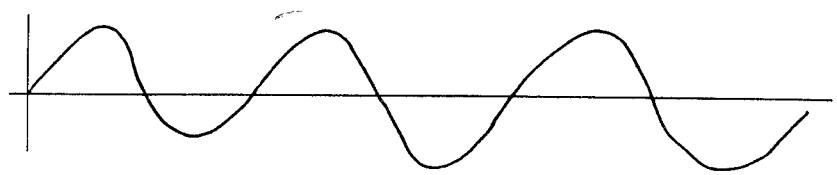
FIG. 4 shows an enlarged curve of the wave detected by the feeler.
Figure 5:
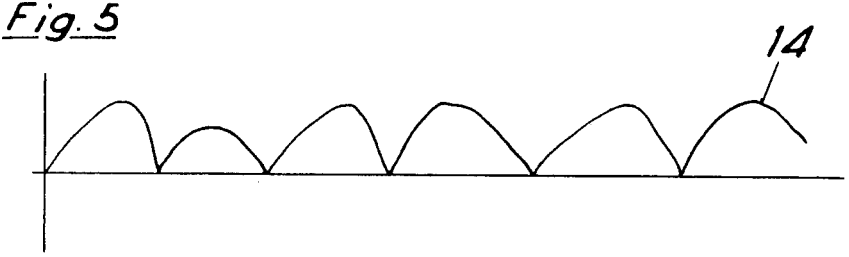
FIG. 5 shows the curve of FIG. 4, but rectified.

The twice integrated signal from integrator 12 is representative of the undulatory deformations due to rail wear and is illustrated in FIG. 4. However, the results obtained at the output of the double integrator 12 may not be utilized in its present form since, for reasons of the large distance travelled by the vehicle as well as the relatively high speed of the vehicle and the limits imposed by the recorder used, the twice integrated signal has to be compressed before being recorded. This operation is effected by rectifying the integrated signal by means of an operational rectifier 13 at the output of which curve 14, shown in FIG. 5, is obtained, and then by amplitude-modulating the peaks of curve 14 in direct proportional to the speed by means of a circuit 15 under the control of the vehicle speed signal determined from block 8 to obtain a running average of the speed in function of the travel distance rather than time.

Figure 6:
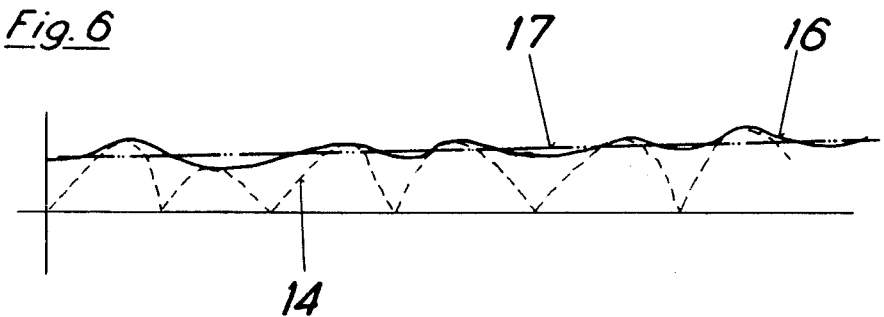
FIG. 6 shows the rectified curve of FIG. 5 together with an amplitude-modulating curve and the resulting main curve of the signals obtained.

In FIG. 6, there are shown the rectified curve 14, the amplitude-modulating curve 16 and its corresponding running average curve 17. It is to be noted that in FIG. 6, the effective compression of the data by means of the running average curve is not taken into account.

That running average 17 provides faithful information about the essential variations of the undulatory surface of the rail, and this without unduly utilizing excessive lengths of paper records. With the present process, a continuous recording of the data which best represents the wear undulation is obtained.

Alternatively, it is also possible to utilize the main value of the undulation corresponding to predetermined sections of the rail instead of the above running average.

Thus, the peak amplitude-modulated signals which are well representative of the wear waveforms appearing along the rail, may be readily recorded. However, pulses corresponding to the defects or the physical setting up of the rails, such as joints, bad weld or other spurious phenomena, may also be detected.

Figure 7:
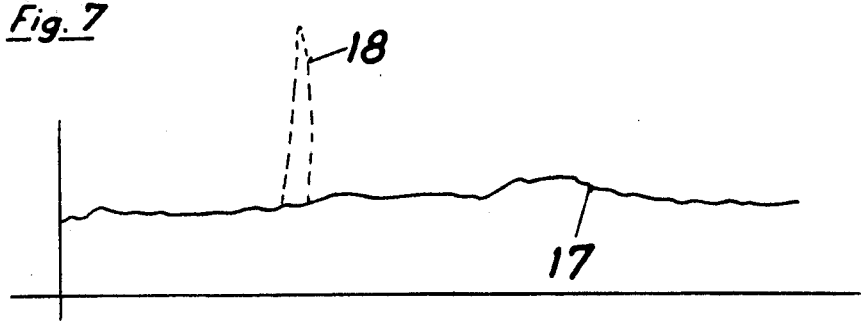
FIG. 7 shows the main curve of FIG. 6 wherein a spurious pulse is detected.

FIG. 7 shows an average curve together with a pulse 18 which is to be eliminated. The elimination of such pulses is rendered necessary because their occurrence frequency as well as their amplitude, which may be more than 10 times as great as that of the oscillation under analysis, would screen the useful signals. Accordingly, recognition and filtering circuit 19 is connected in series with the amplitude-modulating circuit 15 to detect those spurious pulses, whereby the useful signal free from sporadic or repetitive disturbances is transmitted to the stylet 20 of the recorder 21.

The filtering circuit 19 operates to measure the slope variation of the input signal through determination of the first derivative of the signal with respect to time. Therefore, when the signal slope steeply increases and goes above typical values given for the undulation under analysis, the filtering circuit 19 operates to eliminate the steep pulse slope. As a result, the stylet 20 does not trace the value of such steep slope, but rather follows the profile of the curve corresponding to the amplitudes respecting the rail wear undulation.

In addition, a detecting circuit 22 is provided to count and to locate the pulses eliminated by the filtering circuit 19, thereby providing additional information about the disturbances and discontinuities present along the rail surface.

Although, the above description of block 23 concerns the detection and measurement of oscillations appearing on the surface of a single rail, a likely arranged system is of course provided for the same purpose for the other rail, which system is to be connected to stylet 24 for recording.

Figure 8:
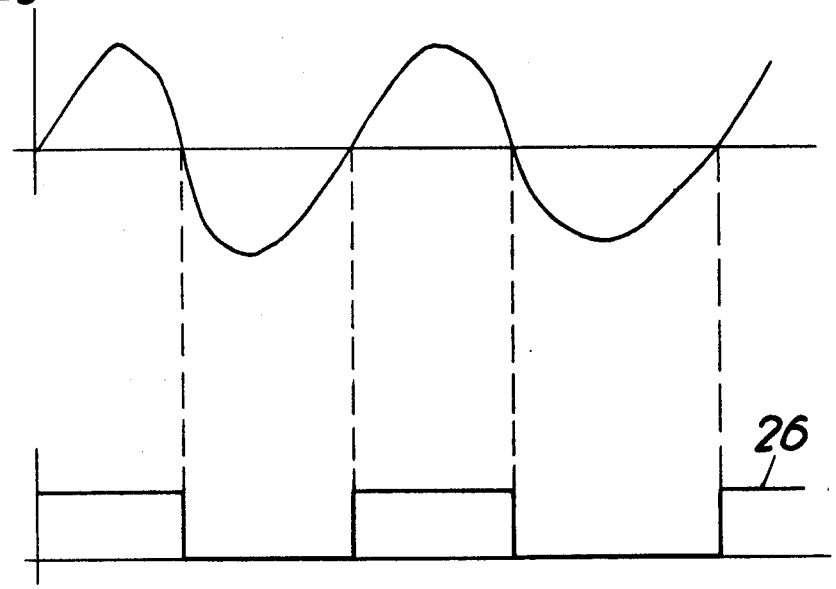
FIG. 8 shows a means to count and determine the length of wave forms.

Now, the amplitude of the undulations being determined, it is also important to know the particular wavelengths thereof. As shown in FIG. 8, the undulation wavelength is determined by counting the number of times the signal appearing at the output of the integrator 12, pass through zero. The output of 12 is fed into a frequency-to-step-voltage converter 25 which converts the undulation frequency into step voltage 26, but a counter sensitive to sign changes of the undulation slope may as well be used. The resulting signal is then fed to a divider 27 to divide the speed signal from block 8 by that frequency to form the desired information about the wavelength. Those data are then recorded by stylet 28, whereas stylet 29 records the corresponding information relative to the other rail.

Besides, it may be of interest to also determine the characteristics of the audio-signals generated by the travelling vehicle. In this case, the audio-signal or sound level is sensed by a microphone 31 which feeds a preamplifier 32 connected to a band-pass filter 33. This filter 33 is similar to filter 7 of block 23 and has its bandwidth and its center frequency controlled by the speed signal issued from block 8 so as to limit the spectrum of the audio-signal to the undulation under analysis.

The output signal from filter 33 is then directed to an amplitude-modulated circuit 35 through a rectifier 34 and then to filter 36 to eliminate the spurious signals in a manner similar to filter 19. The resulting signal is then recorded by stylet 37 on recorder 21. Parallely, the signal delivered by the filter 33 is amplified by the power-amplifier 38 to actuate a speaker 39 which delivers a sound, the level of which corresponds to the signal recorded by stylet 37.

Similarly, a block identical to block 30 may be used to record the acoustical characteristics of the other rail of the railway, the resulting audio-signals being recorded by stylet 40 onto recorded 21 and rendered audible by means of the speaker 41.

Also, means may be provided to reset the recording to zero when the feeler 5 is raised or when the vehicle is stopped. In the process of preparing an efficient grinding operation of the rails, it becomes necessary to know the greatest undulatory wear on both rails, this implying a simultaneous analysis of both records. This inconvenience may be avoided through the use of a device 42 which compares the signal values corresponding to the wear of each rail and which delivers an output signal corresponding to the maximum value of the input signals, which value is recorded by stylet 43. In the same fashion, the device 44 compares the audio levels from both rails and selects the maximum value which is recorded by stylet 45.

Additionally, the vehicle speed measured by block 8 is also recorded by stylet 46.

It is also to be noted that the paper advance speed of the recorder 21 is controlled at 47 by block 8, thereby allowing to obtain records which are in function of the distance travelled by the vehicle.

In addition, there are provided multiple outputs 48 which may serve to transmit each of the recorded signals to other processing apparatus such as magnetic tape recorders, analysers, computers, etc.

The embodiments of the invention in which an exclusive property or privilege is claimed are defined as follows:

1. A process for measuring and recording undulatory deformations of a rail surface, comprising the steps of moving a feeling device along said rail surface, a vertical acceleration of said feeling device being produced upon moving along said rail surface and encountering undulations, generating a voltage signal by means of an accelerometer connected to the feeling device, said voltage signal being representative of the vertical acceleration of the feeling device moved along the rail surface, amplifying the voltage signal and filtering the thus amplified voltage signal through a filter, the filter having a central frequency and band width which vary as a function of the velocity of travel of the feeling device along the rail such that the response characteristics of the filter to wavelengths of the undulations of the rail falling with a range desired to be measured are substantially independent of the velocity, twice integrating the filtered signal, rectifying the twice integrated signal and amplitude-modulating the rectified signal through a circuit, the circuit having a response characteristic directly proportional to the velocity of travel of the feeling device along the rail, filtering the modulated signal to eliminate spurious signals having extremely high amplitude and frequency filtering signal, and recording the lastly filtered signal on a recorder.

2. A process as claimed in claim 1, wherein the feeling device is elastically biased towards the rail surface and is in contact therewith through a face having a curvature radius less than that of a smallest desired to be measured undulation.

3. A process as claimed in claim 1, comprising running average value signal from the amplitude-modulated signal, the former signal being that which is recorded.

4. A process as claimed in claim 3, further comprising the step of detecting peak-amplitude signals relative to said running average value signal representative of undulations having steep variations in slope.

5. A process as claimed in claim 4, further comprising the step of counting the occurrence frequency of the peak amplitude signals and recording same.

6. A process as claimed in claim 1, further comprising the step of counting the number of signal zero crossings at the output of an integrator to provide the frequency of undulatory deformations, and the step of measuring the wavelength of the undulatory deformations by dividing the velocity of travel of the feeling device by the frequency of the undulatory deformations.

7. A process as claimed in claim 1, further comprising measuring and recording undulations on a second rail by the successive steps of electromechanically sensing sound signals generated by the travelling vehicle, converting the sound signals to electrical signals, amplifying the signals and filtering the amplified electrical signals through a band pass filter, the band pass filter having a central frequency and band width which vary as a function of the velocity of the vehicle along the rail such that the response characteristics of the filter to wavelengths of the undulations of the rail falling within a range desired to be measured are substantially independent of the velocity, rectifying and thereafter amplitude-modulating the filtered signals with a signal having a frequency directly proportional to the velocity of the vehicle, filtering the modulated signal by means of a filter, which eliminates spurious signals having extremely high amplitude and frequency with respect to said modulated signal and recording the resulting signal.

8. A process for measuring and recording undulatory deformations according to claim 1 and further comprising the step of measuring and recording undulatory deformations on a second independent rail surface in the same manner as to that of the first rail surface, wherein the deformations along each rail surface are measured and recorded and wherein, prior to recording, the first and second signals are compared by means of a comparator circuit, the signal having the highest value being selected and recorded.

9. A process for measuring and recording undulatory deformations according to claim 7 wherein the sound signals occurring along each rail surface are individually measured according to the method of claim 8, and the lastly filtered sound signals are compared, the signal having the highest value being selected and recorded.

10. A system for measuring and recording undulatory deformations along a rail surface, comprising means mountable on a rail-born vehicle for feeling said deformations along the surface, an accelerometer connected to said feeling means to generate a voltage signal representative to the vertical acceleration induced in the feeling means by said undulatory deformations, means connected to said accelerometer for amplifying the voltage signal, means including a filter connected to the amplifying means for filtering the amplified signal as a function of the velocity of the vehicle, said filter having a central frequency and band width which vary such that the response characteristics of the filter to wavelengths of the undulations of the rail falling within a range desired to be measured are substantially independent of the velocity, means connected to the filtering means for twice integrating the filtered signal, means connected to the integrating means for rectifying the integrated signal, means connected to the rectifying means for amplitude-modulating the rectified signal in direct proportion to the velocity of the vehicle, means connected to the amplitude-modulating means for filtering the modulated signal to eliminate spurious signals having extremely high amplitude and frequency with respect to said modulated signal and means connected to the amplitude-modulating means for recording the resulting signal.

11. A system as claimed in claim 10, wherein the surface of said feeling means in contact with the rail surface is shaped so as to define a curvature radius less than that of a smallest undulatory deformation desired to be measured, and means for mounting said feeling means to elastically contact the rail surface.

12. A device as claimed in claim 10, comprising means for counting and recording said steep slope deformations.

13. A device as claimed in claim 10, further comprising means for sensing the velocity of the vehicle, means for sensing the occurrence frequency of deformations and means for converting the twice integrated signal into a running average value of speed and for dividing the travelling speed of the vehicle by the occurrence frequency of said deformations to obtain the wavelength of said undulatory deformations.

14. A device as claimed in claim 10, further comprising electromechanical means for sensing sound signals generated by the travelling vehicle, means connected to said electromechanical means for amplifying said sensed signals, means connected to the amplifying means for filtering the amplified signals, said latter means having a filter with a center frequency and a bandwidth which are variable with respect to the vehicle speed such that the response characteristics of the filter to wavelength, of the undulations of the rail falling within a range desired to be measured are substantially independent of the velocity, means connected to the filtering means for rectifying the filtered signals, means connected to the rectifying means for amplitude-modulating the rectified signals with a signal corresponding to the velocity of the vehicle, second filtering means connected to the amplitude-modulating means to eliminate spurious signals having extremely high amplitude and frequency with respect to said modulated signal the modulated signals, and means connected to the sound filtering means for recording the filtered signal.

15. A system for measuring and recording undulatory deformations according to claim 10 further comprising along a second independent rail surface, means for measuring and recording deformations along the second rail surface in the same manner as along the first rail surface means for comparing the two signals from the second filtering means and means connected to the comparing means for selecting and recording the highest value signal.

16. A system for measuring and recording undulatory deformations according to claim 14 along a second independent rail surface further comprising means for sensing and recording the sound signals along the second rail surface in the same manner as along the first rail surface, means for comparing the signals from the second filtering means and means connected to the comparing means for selecting and recording the highest sound signals.

17. A system as claimed in claim 14 further comprising means connected to said second filtering means for amplifying the output sound signals of said filtering means.

* * * * *